US006461421B1

(12) United States Patent
Ronvak

(10) Patent No.: US 6,461,421 B1
(45) Date of Patent: Oct. 8, 2002

(54) HYDROCARBONACEOUS COMPOSITION CONTAINING ODOR SUPPRESSANT

(76) Inventor: Alan Jeffrey Ronvak, 5705 Vines Rd., Howell, MI (US) 48843

(*) Notice: Subject to any disclaimer, the term of this patent is extended or adjusted under 35 U.S.C. 154(b) by 0 days.

(21) Appl. No.: 09/541,125

(22) Filed: Mar. 31, 2000

Related U.S. Application Data

(63) Continuation-in-part of application No. 09/440,976, filed on Nov. 16, 1999, now abandoned.

(51) Int. Cl.⁷ .................... C09D 195/00; C08L 95/00
(52) U.S. Cl. .................... 106/285; 106/273.1; 585/2; 585/3
(58) Field of Search .............. 106/273.1, 285; 585/2, 3

(56) References Cited

U.S. PATENT DOCUMENTS 5,271,767 A * 12/1993 Light, Sr. et al. .......... 106/246
5,362,316 A * 11/1994 Paradise .................... 106/278

OTHER PUBLICATIONS

Grant et al, Grant & Hackh's Chemical Dictionary, McGraw–Hill, Inc., New York, 1994, pp. 99, 138, 921.*
Hawley et al, The Condensed Chemical Dictionary, 1973, p. 58.*
Kalinger et al, CAPLUS 1997:712511, "Reduction of odor from hot asphalt", 1997.*
International Search Report, International Application No. PCT/US00/27315, dated Mar. 13, 2001.

* cited by examiner

Primary Examiner—David Brunsman
(74) Attorney, Agent, or Firm—Renner, Otto, Boisselle & Sklar, LLP

(57) ABSTRACT

This invention relates to a composition, comprising: (A) an odor-emitting hydrocarbonaceous material; and (B) an odor-suppressing amount of an aldehyde or a ketone, and a carboxylic acid ester.

25 Claims, No Drawings

HYDROCARBONACEOUS COMPOSITION CONTAINING ODOR SUPPRESSANT

This application is a continuation-in-part of U.S. application Ser. No. 09/440,976 filed Nov. 16, 1999 now abandoned. The disclosure of this prior application is incorporated herein by reference in its entirety.

TECHNICAL FIELD

This invention relates to hydrocarbonaceous compositions containing odor suppressants, and, more particularly; to a composition comprised of an odor-emitting hydrocarbonaceous material and an odor-suppressing amount of a mixture of an aldehyde or a ketone and a carboxylic acid ester.

BACKGROUND OF THE INVENTION

The need for odor reduction in hydrocarbonaceous materials such as asphalt, middle distillate fuels, and the like, is well known. To date no satisfactory solution to this problem is commercially available.

U.S. Pat. No. 5,271,767 discloses an odor-free hot-mix asphalt composition which consists essentially of liquid asphalt, or a hot-mix asphalt or a hot mix, cold lay asphalt, or a rubberized hot mix asphalt or a hot mix asphalt with added latex, containing an effective amount of an additive comprising a citrus terpene (4-isopropyl-1-methylcyclohexene) D-limonene mixed with a vegetable oil such as cottonseed oil, soya oil, rapeseed (canola) oil, peanut oil, corn oil, sunflower oil, palm oil, coconut oil, and palm kernal oil. etc., and an effective amount of a silicone oil dispersant. The reference indicates that a preferred additive composition consists essentially of 10–15 parts citrus terpene (D-limonene) and 85–90 parts vegetable oil, and an effective amount up to about 2 parts silicone oil, the parts in the composition totaling 100. The reference also indicates that when 0.5–1.0 parts of this composition are mixed with 99.0–99.5 parts liquid asphalt the resulting liquid asphalt composition is substantially free of characteristic asphalt odors, and other objectionable odors. The reference indicates that when 4–8 parts of the mixture are mixed with 99–96 parts of aggregate, the resulting hot-mix asphalt composition is substantially free of characteristic asphalt odor, and other objectionable odors. The reference indicates that hot-mix asphalt plants are also free of characteristic asphalt odor, and other objectionable odors.

SUMMARY OF THE INVENTION

This invention relates to a composition, comprising: (A) an odor-emitting hydrocarbonaceous material; and (B) an odor-suppressing amount of an aldehyde or a ketone, and a carboxylic acid ester. The odor-emitting hydrocarbonaceous material may be any hydrocarbonaceous material that emits an objectionable or undesirable odor. In one embodiment, the odor-emitting hydrocarbonaceous material is an asphalt. In one embodiment, it is a middle distillate fuel.

DETAILED DESCRIPTION OF THE PREFERRED EMBODIMENTS

The odor-emitting hydrocarbonaceous material may be any hydrocarbonaceous material that emits at ambient temperatures or elevated temperatures undesirable or objectionable odors. These hydrocarbonaceous materials may be based on one or more natural oils, synthetic oils, or a combination thereof. The hydrocarbonaceous materials may contain one or more volatile (at ambient or elevated temperatures) components such as aliphatic or aromatic hydrocarbons (e.g., methane, ethane, propane, one or more butanes, pentanes, hexanes, benzene, and the like).

The natural oils include animal oils and vegetable oils (e.g., castor oil, lard oil) as well as mineral oils such as liquid petroleum oils and solvent treated or acid-treated mineral oils of the paraffinic, naphthenic or mixed paraffinic—naphthenic types. Oils derived from coal or shale are included. Synthetic oils include hydrocarbon oils such as polymerized olefins, alkylbenzenes, polyphenyls, alkylated diphenyl ethers and alkylated diphenyl sulfides. Synthetic oils include alkylene oxide polymers, esters of dicarboxylic acids, silicon-based oils, and the like.

Unrefined, refined and rerefined oils, either natural or synthetic (as well as mixtures of two or more of any of these) of the type disclosed herein above are included. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those skilled in the art such as solvent extraction, secondary distillation, acid or base extraction, filtration, percolation, etc. Rerefined oils are obtained by processes similar to those used to obtain refined oils applied to refined oils which have been already used in service. Such rerefined oils are also known as recycled, reclaimed or reprocessed oils and often are additionally processed by techniques directed to removal of spent additives and oil breakdown products.

The term "asphalt" as used herein refers to any of a variety of solid or semi-solid materials at room temperature which gradually liquify when heated, and in which the predominant constituents are naturally occurring bitumens of which are obtained as residue in petroleum refining. Asphalt is further defined by Kirk-Othmer, Encyclopedia of Chemical Technology, Vol. 3, Third Ed. (1978) pp. 284–327, John Wiley & Sons, New York. An additional discussion appears in the publication entitled "A Brief Introduction to Asphalt and some of its Uses", Manual Series No. 5 (MS-5), The Asphalt Institute, 7th Ed., September, 1974. Both of these references are incorporated herein by reference.

The asphalts which may be treated in accordance with this invention include natural asphalts and petroleum asphalts which are generally known for roofing and paving applications. The natural asphalts include, for example, asphaltite such as gilsonite, grahamite and glance pitch; lake asphalt such as trinidad asphalt; and rock asphalt. The petroleum asphalts include straight asphalt obtained by distillation of a crude oil (unblown and substantially unoxidized), blown asphalt produced by blowing an oxygen-containing gas into a straight asphalt in the presence or absence of a catalyst, solvent-extracted asphalt obtained when asphaltic material is separated from the petroleum fraction containing it by the use of propane or other solvents, and cut-back asphalt which is a mixture of straight asphalt and a light petroleum solvent. The asphalts include petroleum tar and asphalt cement. The petroleum tars include oil gas tar obtained as a by-product when gases are produced from petroleum fractions, such tar in refined form, cut-back tar obtained by mixing a light petroleum fraction with such tar, and tar -pitch obtained as a residue by removing the volatile fraction from such tar.

Any of these kinds of asphalt may be used singly or jointly. Straight asphalt is useful for paving applications, and oxidized and blown asphalts are useful for roofing applications.

The asphalt cements that are useful may be characterized by a penetration (PEN, measured in tenths of a millimeter, dmm) of less than 400 at 25° C., and a typical penetration is between 40 and 300 (ASTM Standard, Method D-5). The viscosity of asphalt cement at 60° C. is typically more than about 65 poise.

Asphalt cements are often defined in terms specified by the American Association of State Highway Transportation Officials (AASHTO) AR viscosity system. Two sets of typical specifications are as follows:

| TEST | AC 2.5 | AC 5 | AC 10 | AC 20 | AC 30 | AC 40 |
|---|---|---|---|---|---|---|
| Viscosity @ 140°F., poise (AASHTO T-202) | 250 ± 50 | 500 ± 100 | 1000 ± 200 | 2000 ± 400 | 3000 ± 600 | 4000 ± 800 |
| Viscosity @ 275°F., cSt, minimum (AASHTO T-201) | 125 | 175 | 250 | 300 | 350 | 400 |
| Pen. @ 77° minimum (AASHTO T-49) | 220 | 140 | 80 | 60 | 50 | 40 |
| Flash Point, COC Minimum ° F. | 325 | 350 | 425 | 450 | 450 | 450 |
| Ductility After TFOT (AASHTO T-179) @ 77° F., 5 CM/MIN, minimum | 100 | 100 | 75 | 50 | 40 | 25 |
| Viscosity After TFOT (AASHTO T-179) @ 140° F., poise, minimum | 1000 | 2000 | 4000 | 8000 | 12000 | 16000 |

| | AR1000 | AR2000 | AR4000 | AR8000 | AR16000 |
|---|---|---|---|---|---|
| Viscosity @ 140° F., poise (AASHTO T-202) | 1000 ± 250 | 2000 ± 500 | 4000 ± 1000 | 8000 ± 2000 | 16000 ± 4000 |
| Viscosity @ 275° F., cSt, minimum (AASHTO T-201) | 140 | 200 | 275 | 400 | 500 |
| Pen. @ 77° F., minimum (AASHTO T-49) | 65 | 40 | 25 | 20 | 20 |
| Percent of Original Pen. @ 77° F., minimum | — | 40 | 45 | 50 | 52 |
| Ductility @ 77° F., minimum, 5 cm/min | 100 | 100 | 75 | 75 | 75 |

The asphalt compositions of the present invention are particularly useful for preparing asphalt coating compositions. These include aggregate-containing asphalts such as employed in the paving of roads, bridges, airport runways, sidewalks, etc. The asphalt compositions of the present invention may be mixed with aggregate while in a fluid or molten condition. Typically, the asphalt composition is mixed with preheated, predried aggregates to form a homogeneous mixture of uniformly coated aggregates which may be used to form a paving composition. This mixing procedure is typically performed at an asphalt mixing plant. The aggregate may be heated under conditions of time and temperature that are sufficient to drive off essentially all free moisture prior to mixing. During mixing, both the aggregate and the inventive asphalt composition are typically at temperatures of about 100° C. to about 160° C. Before the resulting composition is cooled to a temperature at which it loses its workability, it may be spread on a road bed, for example, and then compacted and permitted to cure. After curing, the resulting paving composition comprises aggregate bound by a matrix of asphalt binder.

The asphalt compositions of the present invention may also be useful for preparing improved seal coats. A seal coat is generally applied as a hot asphalt, cutback asphalt, or emulsified asphalt. The seal coat is generally applied at a rate of about 0.05 to about 0.8 gallons per square yard of surface. In one embodiment, the application rate is about 0.35 gallons per square yard of surface. The molten or fluid asphalt is generally sprayed from a truck. The aggregate is placed on top of the asphalt. Rolling or compacting the aggregate into the asphalt finishes the application.

The asphalt compositions of the present invention, after formation, may be handled by conventional techniques to maintain them in fluid or molten form under, for example, road-building conditions. For example, the asphalts may be formed into a cutback by fluxing the asphalt with a suitable volatile solvent or distillate. The asphalt cutback may then be directly mixed with aggregate and applied as a paving composition in fluid form, possibly at ambient temperatures. Another conventional technique for fluidizing the asphalt prior to mixing with aggregate and forming into a paving composition is to emulsify the asphalt by known techniques. An advantage of this method of fluidizing is that after mixing with the aggregate, it may be applied as a paving composition at ambient temperature.

The term "aggregate" as used herein is intended to include solid particles having a range of sizes including fine particles such as sand to relatively coarse particles such as crushed stone, gravel or slag. For example, the breakdown of Texas pea gravel aggregate is as follows:

| Gradation | (% Passing) |
|---|---|
| ½" | 100 |
| 3/8" | 98 |
| #4 | 71 |
| #10 | 46 |
| #40 | 30 |
| #80 | 7.8 |
| #200 | 1.0 |

The above aggregate has a composition of 52.5% Pea Gravel, 14.3% screenings and 28.6% sand.

The ratio of aggregate to asphalt depends upon their properties and the desired end use. For typical road paving compositions, the paving composition will comprise a minimum of about 85% by weight of aggregate, and generally between about 90% to about 96% by weight of the total paving composition will be aggregate.

The middle distillate fuels contemplated herein include gasoline, fuel oils including Nos. 1, 2 and 3 fuel oils used in heating and as diesel fuel oils, turbine fuels, jet fuels, and the like. The base stock may consist of straight chains or branched chains of paraffins, cycloparaffins, olefins, aromatic hydrocarbons, or mixtures thereof. The base stocks include mixtures of hydrocarbons boiling in the gasoline boiling range. The base stock may be derived from straight run naphtha, polymer gasoline, natural gasoline or from catalytically cracked or thermally cracked hydrocarbons and catalytically cracked reformed stock. The base stock may be a straight-run distillate fuel oil or a catalytically (including hydrocracked) or thermally cracked distillate fuel oil. The base stock may be treated in accordance with well-known commercial methods, such as acid or caustic treatment, dehydrogenation, solvent refining, clay treatment, and the like. The middle distillate fuel may be a recycled fuel oil.

The middle distillate fuel compositions may additionally contain any of the additives generally employed in fuel compositions. These include detergents, anti-knock compounds, anti-icing additives, upper cylinder and fuel pump lubricity additives, corrosion inhibitors, extreme pressure agents, low temperature properties modifiers, and the like.

The aldehydes that are useful include compounds represented by the formula

(I)

wherein in formula (I), R is hydrogen, a hydrocarbyl group or a hydroxy substituted hydrocarbyl group. The hydrocarbyl groups and the hydroxy substituted hydrocarbyl groups may contain from 1 to about 25 carbon atoms, and in one embodiment about 6 to about 18 carbon atoms, and in one embodiment about 6 to about 12 carbon atoms.

As used throughout the specification and in the claims, the term "hydrocarbyl" group is used to refer to a group having one or more carbon atoms directly attached to the remainder of a molecule and having a hydrocarbon or predominantly hydrocarbon character. Examples include:

(1) purely hydrocarbon groups, that is, aliphatic (e.g., alkyl, alkenyl or alkylene), and alicyclic (e.g., cycloalkyl, cycloalkenyl) groups, aromatic groups, and aromatic-, aliphatic-, and alicyclic-substituted aromatic groups, as well as cyclic groups wherein the ring is completed through another portion of the molecule (e.g., two substituents together forming an alicyclic group);

(2) substituted hydrocarbon groups, that is, hydrocarbon groups containing non-hydrocarbon groups which, in the context of this invention, do not alter the predominantly hydrocarbon nature of the group (e.g., halo, hydroxyl, alkoxy, mercapto, alkylmercapto, nitro, nitroso, sulfoxy, and the like);

(3) hereto substituted hydrocarbon groups, that is, hydrocarbon groups containing substituents which, while having a predominantly hydrocarbon character, in the context of this invention, contain other than carbon in a ring or chain otherwise composed of carbon atoms. Heteratoms include sulfur, oxygen, and nitrogen. In general, no more than two, and in one embodiment no more than one, non-hydrocarbon substituent is present for every ten carbon atoms in the hydrocarbyl group.

Examples of useful aldehydes include formaldehyde, acetaldehyde, propionaldehyde, n-butyraldehyde, n-valeraldehyde, caproaldehyde, acrolein, tran-2-cis-6-nonadienal, n-heptylaldehyde, trans-2-hexenal, hexadeconal, phenylacetaldehyde, o-tolualdehyde, m-tolualdehyde, p-tolualdehyde, salicylaldehyde, p-hydroxybenzaldehyde, anisaldehyde, piperonal, vanillin, benzaldehyde, and mixtures of two or more thereof. Benzaldehyde and vanillin are useful.

The ketones that are useful include compounds represented by the formula

(II)

wherein in formula (II), $R^1$ and $R^2$ independently are hydrocarbyl groups or hydroxy substituted hydrocarbyl groups, or $R^1$ and $R^2$ are linked together to form a cyclic group or a hydroxy-substituted cyclic group. In one embodiment, $R^1$ and $R^2$ independently contain from 1 to about 25 carbon atoms. In one embodiment, $R^1$ contains about 6 to about 18 carbon atoms, and $R^2$ contains about 1 to about 25 carbon atoms. Examples of useful ketones include acetone, methyl ethyl ketone, diethyl ketone, 2-pentanone, 3-pentanone, 2-hexanone, 3-hexanone, methyl isobutyl ketone, t-butyl methyl ketone, cyclopentanone, cyclohexanone, methyl vinyl ketone, mesityl oxide, biacetyl, acetylacetone, acetophenone, propiophenone, n-butyrophenone, benzophenone, hydroxymethylpyrone, and mixtures of two or more thereof.

The carboxylic acid esters that are useful may be represented by the formula

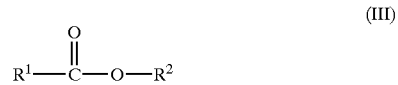

(III)

wherein in formula (III), $R^1$ and $R^2$ independently are hydrocarbyl groups of 1 to about 25 carbon atoms. In one embodiment, $R^1$ and $R^2$ independently contain from 1 to about 18 carbon atoms, and in one embodiment from 1 to about 12 carbon atoms, and in one embodiment from 1 to about 6 carbon atoms. Examples of useful carboxylic acid esters include methyl acetate, ethylacetate, propylacetate, butyl acetate, n-pentyl acetate, amyl acetate, benzyl acetate, phenyl acetate, ethyl formate, ethyl acetate, ethyl propionate, ethyl butyrate, ethyl valerate, ethyl stearate, ethylphenyl acetate, ethyl benzoate, allyl caproate, amyl butyrate, or a mixture of two or more thereof.

Component (B) typically contains from about 10% to about 90% by weight, and in one embodiment about 20% to about 80% by weight, and in one embodiment about 50% to about 80% by weight of the aldehyde or ketone. Component (B) typically contains from about 90% to about 10% by weight, and in one embodiment about 80% to about 20% by weight, and in one embodiment about 50% to about 20% by weight of the carboxylic acid ester.

The inventive compositions may be comprised of an odor-emitting hydrocarbonaceous material (A), and an odor-suppressing amount of component (B). In one embodiment, the concentration of component (B) in the hydrocarbonaceous material (A) is from about 0.1 to about 20 gallons of component (B) per 12,000 gallons of hydrocarbonaceous material (A). In one embodiment, this concentration is from about 0.5 to about 10 gallons of component (B) per 12,000 gallons of hydrocarbonaceous material (A), and in one embodiment from about 0.5 to about 5 gallons of (B) per 12,000 gallons of (A). In one embodiment, the concentration is from about 0.7 to about 3 gallons of component (B) per 12,000 gallons of component (A), and in one embodiment from about 0.9 to about 2 gallons of component (B) per 12,000 gallons of component (A).

Component (8) may be blended into the hydrocarbonaceous material (A) using mixing procedures known in the art. Typically, the hydrocarbonaceous material is in a fluid or molten condition during mixing. When the hydrocarbonaceous material is an asphalt the mixing temperature may be in the range of about 250° F. (121° C.) to about 340° F. (171° C.), and in one embodiment about 280° F. (138° C.) to about 320° F. (160° C.).

An advantage of the present invention is that by virtue of the use of component (B) in the inventive compositions, the odor that is characteristic of odor-emitting hydrocarbonaceous materials such as hot or molten asphalt, middle distillate fuels, and the like is significantly reduced or eliminated. This may be evidenced by smell. While not wishing to be bound by theory, it is believed that in one embodiment, the odor reduction or elimination results from a reduction or elimination in the emissions of volatile hydrocarbon materials in the hydrocarbonaceous material. In one embodiment, it is believed that the light ends of the inventive asphalt compositions do not burn off during heating (or their loss is significantly reduced) as a result of the incorporation of component (B) into such compositions.

EXAMPLE 1

| The following mixture is prepared: | |
|---|---|
| | wt % |
| Trans-2-cis-6-nonadienal | 0.02% |
| n-heptyl aldehyde | 0.10% |
| Hydroxy methyl pyrone | 0.10% |
| Trans-2-hexanal | 0.20% |
| Alfyl caproate | 0.50% |
| Hexadecanal | 3.10% |
| Vanillin | 5.00% |
| Amyl butyrate | 6.00% |
| Ethyl butyrate | 10.00% |
| Amyl acetate | 15.00% |
| Benzaldehyde | 60.01% |

EXAMPLE 2

The mixture from Example 1 is mixed with a performance grade 52–28 asphalt at a concentration of 1 gallon of the mixture per 12,000 gallons of asphalt, the temperature of the asphalt being 150° C., with the result being a substantial reduction in odor being given off by the asphalt as evidenced by smell.

EXAMPLE 3

The mixture from Example 1 is mixed with a performance grade 58–28 asphalt at a concentration of 1 gallon of the mixture per 12,000 gallons of asphalt, the temperature of the asphalt being 150° C., with the result being a substantial reduction in odor being given off by the asphalt as evidenced by smell.

EXAMPLE 4

The mixture from Example 1 is mixed with a performance grade 64–22 asphalt at a concentration of 1 gallon of the mixture per 12,000 gallons of asphalt, the temperature of the asphalt being 150° C., with the result being a substantial reduction in odor being given off by the asphalt as evidenced by smell.

EXAMPLE 5

The mixture from Example 1 is mixed with a performance grade 70–22 asphalt at a concentration of 1 gallon of the mixture per 12,000 gallons of asphalt, the temperature of the asphalt being 150° C., with the result being a substantial reduction in odor being given off by the asphalt as evidenced by smell.

EXAMPLE 6

The mixture from Example 1 is mixed with a performance grade 70–28 asphalt at a concentration of 1 gallon of the mixture per 12,000 gallons of asphalt, the temperature of the asphalt being 150° C., with the result being a substantial reduction in odor being given off by the asphalt as evidenced by smell.

EXAMPLE 7

The mixture from Example 1 is mixed with a recycled fuel oil at a concentration of 4 gallons of the mixture per 29,704.5 gallons of fuel oil, the temperature of the fuel oil being 38° C., with the result being a substantial reduction in odor being given off by the fuel oil as evidenced by smell.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A composition, comprising:
   (A) an odor-emitting hydrocarbonaceous material; and
   (B) an odor-suppressing amount of an aldehyde or a ketone, and a carboxylic acid ester, the carboxylic acid ester being a compound represented by the formula

(III)

$$R^1-\overset{O}{\underset{\|}{C}}-O-R^2$$

wherein in formula (III), $R^1$ and $R^2$ independently are hydrocarbyl groups of 1 to about 25 carbon atoms.

2. The composition of claim 1 wherein said odor-emitting hydrocarbonaceous material is an asphalt.

3. The composition of claim 2 wherein said asphalt is a roofing asphalt or paving asphalt.

4. The composition of claim 2 wherein said asphalt is a natural asphalt or a petroleum asphalt.

5. The composition of claim 2 wherein said asphalt is an asphaltite, lake asphalt or rock asphalt.

6. The composition of claim 2 wherein said asphalt is a straight asphalt obtained by distillation of a crude oil, a blown asphalt produced by blowing an oxygen-containing gas into a straight asphalt, a solvent-extracted asphalt obtained from a petroleum fraction, or a cut-back asphalt.

7. The composition of claim 2 wherein said asphalt is a petroleum tar or an asphalt cement.

8. A paving composition comprising aggregate and the composition of claim 2.

9. The composition of claim 1 wherein said odor-emitting hydrocarbonaceous material is a middle distillate fuel.

10. The composition of claim 9 wherein said middle distillate fuel is a fuel oil, diesel fuel, gasoline, turbine fuel or jet fuel.

11. The composition of claim 9 wherein said middle distillate fuel is a fuel oil.

12. The composition of claim 9 wherein said middle distillate fuel is a recycled fuel oil.

13. The composition of claim 1 wherein said aldehyde is a compound represented by the formula

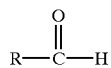
(I)

wherein in formula (I), R is hydrogen or a hydrocarbyl group of 1 to about 25 carbon atoms.

14. The composition of claim 13 wherein in formula (I), R is a hydrocarbyl group of about 6 to about 18 carbon atoms.

15. The composition of claim 1 wherein said aldehyde comprises benzaldehyde.

16. The composition of claim 1 wherein said aldehyde comprises vanillin.

17. The composition of claim 1 wherein said ketone is a compound represented by the formula

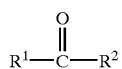
(II)

wherein in formula (II), $R^1$ and $R^2$ independently are hydrocarbyl groups or hydroxy substituted hydrocarbyl groups, or $R^1$ and $R^2$ are linked together to form a cyclic group or a hydroxy-substituted cyclic group.

18. The composition of claim 1 wherein said composition comprises from about 0.1 to about 20 gallons of (B) per 12,000 gallons of (A).

19. A composition made by mixing (A) asphalt with (B) an odor-suppressing amount of an aldehyde or a ketone, and a carboxylic acid ester, the carboxylic acid ester being a compound represented by the formula

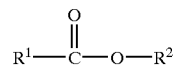
(III)

wherein in formula (III), $R^1$ and $R^2$ independently are hydrocarbyl groups of 1 to about 25 carbon atoms.

20. The composition of claim 19 wherein (B) comprises vanillin, benzaldehyde and said carboxylic acid ester.

21. The composition of claim 19 wherein (B) comprises trans-2-cis-nonadienal, n-heptyl aldehyde, hydroxy methyl pyrone, trans-2-hexenal, allyl caproate, hexadecanal, vanillin, amyl butyrate, ethyl butyrate, amyl acetate, and benzaldehyde.

22. A composition made by mixing (A) a middle distillate fuel with (B) an odor-suppressing amount of an aldehyde or a ketone, and a carboxylic acid ester, the carboxylic acid ester being a compound represented by the formula

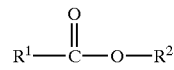
(III)

wherein in formula (III), $R^1$ and $R^2$ independently are hydrocarbyl groups of 1 to about 25 carbon atoms.

23. The composition of claim 22 wherein (B) comprises vanillin, benzaldehyde and said carboxylic acid ester.

24. The composition of claim 22 wherein (B) comprises trans-2-cis-nonadienal, n-heptyl aldehyde, hydroxy methyl pyrone, trans-2-hexenal, allyl caproate, hexadecanal, vanillin, amyl butyrate, ethyl butyrate, amyl acetate, and benzaldehyde.

25. A composition, comprising:

(A) an odor-emitting hydrocarbonaceous material; and (B) an odor-suppressing amount of an aldehyde or a ketone, and a carboxylic acid ester;

wherein said carboxylic acid ester is methyl acetate, ethyl acetate, propyl acetate, butyl acetate, n-pentyl acetate, amyl acetate, benzyl acetate, phenyl acetate, ethyl formate, ethyl acetate, ethyl propionate, ethyl butyrate, ethyl valerate, ethyl stearate, ethyl phenylacetate, ethyl benzoate, allyl caproate, amyl butyrate, or a mixture of two or more thereof.

* * * * *

UNITED STATES PATENT AND TRADEMARK OFFICE
CERTIFICATE OF CORRECTION

PATENT NO. : 6,461,421 B1
DATED : October 8, 2002
INVENTOR(S) : Alan Jeffrey Ronyak It is certified that error appears in the above-identified patent and that said Letters Patent is hereby corrected as shown below:

<u>Title page,</u>
Inventor name should read -- Alan Jeffrey Ronyak --

Signed and Sealed this

Eleventh Day of February, 2003

JAMES E. ROGAN
*Director of the United States Patent and Trademark Office*